3,455,652
PROCESS FOR THE PRODUCTION OF SULFUR
TRIOXIDE AND SULFURIC ACID
George Russell James, Armonk, N.Y., assignor to
Chemical Construction Corporation, New York,
N.Y., a corporation of Delaware
Filed May 31, 1966, Ser. No. 553,924
Int. Cl. C01b 17/68, 17/74, 17/76
U.S. Cl. 23—168                              1 Claim

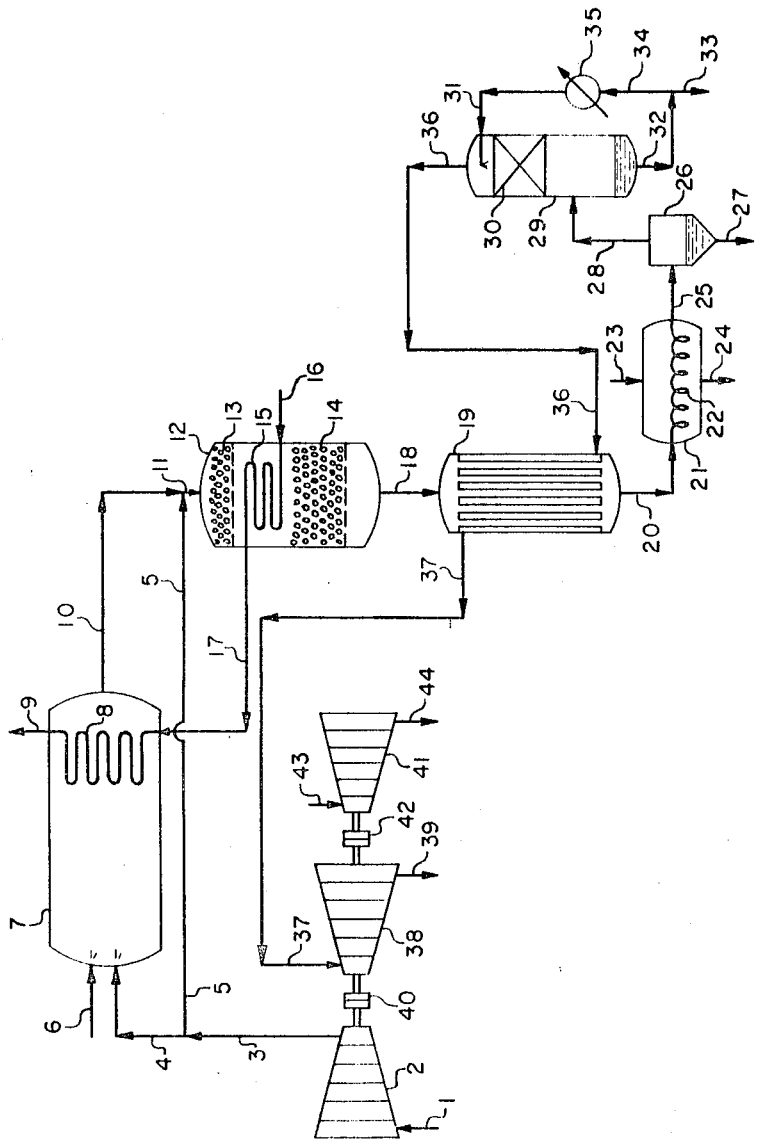

ABSTRACT OF THE DISCLOSURE

A high pressure process for the production of pure sulfur trioxide and sulfuric acid is provided, in which a process gas stream containing sulfur dioxide is produced by burning a sulfur-containing material with air which has been compressed in mechanical compression means. The process gas stream is catalytically reacted to oxidize substantially all of the sulfur dioxide to sulfur trioxide at elevated pressure, and the resulting hot gas stream is cooled in a process heat exchanger, and further cooled to selectively condense pure liquid sulfur trioxide, which is separated from the residual gas stream as a product of the process. The residual gas stream is scrubbed with concentrated liquid sulfuric acid to form further sulfuric acid or oleum in solution. The final high pressure tail gas stream, now substantially free of sulfur oxides, is heated in the process heat exchanger, and is expanded to reduced pressure in a gas turbine or other mechanical power recovery means which is connected to and drives the mechanical compression means, thus serving to provide at least a portion of the power requirement for operation of the air compressor.

---

The present invention relates to the production of sulfur trioxide and sulfuric acid. An improved processing sequence is provided, in which the entire process including sulfur dioxide production by combustion of a sulfur-containing feed stream with an oxygen-containing gas stream, catalytic oxidation of sulfur dioxide to sulfur trioxide, selective condensation of a portion of the sulfur trioxide to liquid and separation of liquid sulfur trioxide as a co-product, and absorption of residual sulfur trioxide to form sulfuric acid is carried out at elevated pressure. The residual gas stream after absorption is heated by heat exchange with the hot process gas stream produced after catalytic conversion, and the heated residual gas stream is expanded in mechanical power recovery means which is connected with the mechanical compression means serving to compress the oxygen-containing gas stream, and thus the mechanical power recovery means serves to provide at least a portion of the power required to operate the mechanical compression means.

Numerous procedures have been developed for the production of sulfuric acid, all of which involve the basic sequence of combustion of a sulfur-containing feed stream with an oxygen-containing gas stream to form a process gas stream containing sulfur dioxide, cooling of the process gas stream to optimum temperature, catalytic oxidation of sulfur dioxide to sulfur trioxide, and absorption of the sulfur trioxide in concentrated sulfuric acid to form further sulfuric acid. The sulfur-containing feed stream may consist of elemental sulfur, hydrogen sulfide, pyrites or other sulfides, or sludge acid derived from petroleum refining. Elemental sulfur is the preferred raw material for large-scale commercial facilities, however the other sulfur sources mentioned supra may also be employed within the scope of the present invention. The oxidation of sulfur dioxide to sulfur trioxide is generally carried out in the presence of a vanadium or platinum catalyst, however other catalytic agents known to the art may also be employed in suitable instances. The oxidation reaction is strongly exothermic. Consequently, in order to avoid overheating of the catalyst, the reaction is generally carried out in a plurality of stages of partial conversion, with cooling of the gas stream being provided between stages. The resultant fully converted sulfur trioxide-containing gas stream is then scrubbed with concentrated sulfuric acid, to form either further sulfuric acid or oleum, which consists of sulfuric acid containing excess dissolved sulfur trioxide. Both of these alternatives are encompassed within the scope of the present invention, as well as the additional alternative of cooling the converted gas stream to selectively condense a portion of the sulfur trioxide content as liquid sulfur trioxide, which is separated from the remaining gas stream as a co-product prior to passing the remaining gas stream to sulfuric acid scrubbing.

Numerous alternatives and modifications of the basic process sequence have been proposed in the prior art. Among these modifications are procedures involving the practice of the catalytic conversion stage under pressure, followed by expansion of the process gas stream to reduced or atmospheric pressure prior to absorption of sulfur trioxide. Processes of this nature are disclosed in U.S. Patent Nos. 1,883,570 and 2,075,075. In addition, the concept of recovering power from sulfur combustion at elevated pressure by expanding the hot sulfur dioxide-containing gas stream to reduced pressure is discussed in the magazine "Chemical Engineering," vol. 67, No. 26, Dec. 26, 1960, at page 100. Finally, U.S. Patent 2,510,684 proposes the production of a mixed sulfur dioxide and trioxide-containing gas stream at elevated pressure, which is cooled to condense a liquid mixture of sulfur dioxide and sulfur trioxide, from which the sulfur trioxide is recovered by rectification.

In the present invention, a sulfuric acid process is provided in which the combustion of a sulfur-containing feed stream to produce a sulfur dioxide-containing process gas stream, the catalytic conversion of the sulfur dioxide in the process gas stream to sulfur trioxide, the selective condensation and separation of liquid sulfur trioxide as a coproduct, and the final absorption of sulfur trioxide from the gas stream in concentrated liquid sulfuric acid to form further sulfuric acid or oleum are all carried out under elevated pressure conditions. The residual gas stream after absorption is heated by heat exchange with the hot process gas stream produced after catalytic conversion, and is then expanded through mechanical power recovery means such as a gas turbine drive the mechanical compression means such as a centrifugal compressor which compresses the oxygen-containing gas such as air used in combustion of the sulfur-containing feed stream.

The process sequence of the present invention provides several important advantages. Since all of the principle stages of the process are carried out at elevated pressure, improved efficiency in terms of more complete catalytic conversion of sulfur dioxide to sulfur trioxide it attained, with the employment of less catalyst. In addition, carrying out the sulfur trioxide absorption stage under elevated pressure serves to enhance the efficiency and rate of sulfur trioxide absorption. Liquid sulfur trioxide is produced as a useful co-product, free of sulfur dioxide. In many instances, the process does not require any external power for compression of the oxygen-containing gas stream, because of the recovery of useful power when the reheated residual gas stream is expanded in power recovery means.

It is an object of the present invention to provide an improved process for the production of sulfuric acid.

Another object is to provide a process for the production of sulfuric acid in which liquid sulfur trioxide is produced as a co-product.

A further object is to provide a process for the production of sulfuric acid in which the process steps are carried out at elevated pressure.

An additional object is to provide a high pressure sulfuric acid process in which at least a portion of the power required for compression of the oxygen-containing gas stream employed in the process is produced by reheating the high pressure residual gas stream discharged after sulfur trioxide absorption, and expanding the reheated residual gas stream through mechanical power recovery means.

These and other objects and advantages of the present invention will become evident from the description which follows. Referring to the figure, which is a flowsheet of a preferred embodiment of the present invention, the process oxygen-containing gas stream 1 usually consists of atmospheric air or oxygen-enriched air. Stream 1 has preferably been pre-dried by means not shown, such as by scrubbing with concentrated sulfuric acid, in order to prevent the subsequent formation of sulfur trioxide mist. The gas stream 1 is initially compressed in mechanical compression means 2, which usually consists of a centrifugal or reciprocating compressor. The resulting high pressure oxygen-containing gas stream 3 discharge from unit 2 is typically at an absolute pressure in the range of 3 kg./sq. cm. to 50 kg./sq. cm., and an elevated pressure within this range is preferably maintained throughout the subsequent steps of catalytic oxidation of sulfur dioxide to sulfur trioxide, condensation and separation of a portion of the sulfur trioxide as liquid sulfur trioxide co-product, and absorption of remaining sulfur trioxide from the gas stream to form sulfuric acid.

Stream 3 is now divided into a major portion stream 4 to be employed in the combustion of a sulfur-containing feed stream, and a minor portion stream 5 which is also employed in the process as will be described infra. Stream 4 is now reacted with sulfur-containing feed stream 6 in combustion furnace 7, which is preferably maintained at a temperature below 1200° C. in order to prevent furnace deterioration and the formation of nitrogen oxides by the fixation of atmospheric nitrogen. As described supra, stream 6 may consist of any of a variety of sulfur-containing materials, however, stream 6 will usually consist of elemental sulfur in large-scale commercial facilities. The resultant sulfur dioxide-containing process gas generated in furnace 7 is preferably produced at a temperature in the range of 600° C. to 1200° C., and will usually contain in excess of 6% sulfur dioxide content together with excess free oxygen, and will preferably contain in the range of 6% to 14% sulfur dioxide content by volume.

The process gas produced in furnace 7 is cooled to a reduced temperature suitable for subsequent catalytic oxidation of sulfur dioxide to sulfur trioxide by heat exchange with a cooling fluid, usually consisting of liquid water, which is passed through cooling coil 8 within furnace 7. The liquid water in coil 8 is vaporized to form high pressure steam, which is passed via stream 9 to external utilization, not shown. The resulting cooled process gas stream 10 removed from unit 7 is at a reduced temperature usually above 350° C. and suitable for subsequent catalytic conversion, and is preferably at a temperature in the range of 350° C. to 550° C. In instances when stream 6 consist of hydrogen sulfide or other hydrogen-containing material, stream 10 will contain water vapor and is dried by means not shown, such as by scrubbing with concentrated liquid sulfuric acid, prior to passing to catalytic conversion.

Stream 10 is now combined with by-pass air stream 5, and the combined process gas stream 11 is passed into catalytic converter 12, in order to oxidize the sulfur dioxide content of stream 11 to sulfur trioxide. Due to the provision of an elevated pressure typically in the range of 3 kg./sq. cm. to 50 kg./sq. cm. within unit 12, the catalytic oxidation reaction takes place at a faster rate and essentially complete conversion to sulfur trioxide is attained. The catalytic converter 12 will generally contain a plurality of catalyst stages or beds in series, with interbed cooling of the process gas stream being provided between stages. Thus, unit 12 contains at least two beds 13 and 14 consisting of a suitable catalyst for the oxidation reaction, such as platinum or vanadium oxide deposited on a suitable carrier. The initial bed 13 is of a suitable volume to achieve only partial conversion, in order to avoid excessive temperature rise due to the exothermic nature of the catalytic oxidation reaction, which could result in catalyst deterioration. Final and substantially complete catalytic oxidation of sulfur dioxide to sulfur trioxide is attained in bed 14. A cooling coil 15 is provided in unit 12 between beds 13 and 14 to attain cooling of the hot partially converted gas stream discharged from bed 13, with a suitable coolant stream 16 usually consisting of liquid water being passed through coil 15. The resulting warmed water stream 17 is passed to coil 8 as described supra.

The resulting hot process gas stream 18 withdrawn from unit 12 below bed 14 now contains sulfur trioxide, together with an essentially negligible proportion of residual sulfur dioxide. In most commercial facilities, at least 99.5% conversion of sulfur dioxide to sulfur trioxide is attained in the catalytic converter. A portion of the sulfur trioxide in stream 18 is recovered in this preferred embodiment of the invention as product liquid sulfur trioxide, while the balance of the sulfur trioxide is recovered as concentrated sulfuric acid or oleum, by scrubbing the gas stream with concentrated aqueous sulfuric acid solution. Stream 18 is initially cooled in heat exchanger unit 19, by heat exchange with the residual scrubbed gas stream free of sulfur trioxide, which is thereby heated.

The cooled process gas stream 20 discharged from unit 19 is now at a temperature typically in the range of 50° C. to 200° C. Stream 20 is passed into heat exchanger-condenser 21, and is further cooled in coil 22 by heat exchange with a suitable refrigerant or chilled water, which is admitted into unit 21 via stream 23 and discharged as warmed coolant stream 24. A concomitant condensation of a portion of the sulfur trioxide in the gas stream to the liquid state takes place within coil 22. The resultant mixed gas-liquid stream 25 discharged from coil 22 is at a temperature typically in the range of 5° C. to 40° C., as is now passed into gas-liquid separator 26. Unit 26 is a conventional gas-liquid separation means such as a cyclonic or baffled vessel. The separated liquid sulfur trioxide is withdrawn from unit 26 as co-product liquid sulfur trioxide stream 27.

The remaining gas phase withdrawn from unit 26 via stream 28 contains a substantial residual proportion of sulfur trioxide, which is recovered as product sulfuric acid or oleum by passing stream 28 into scrubbing tower 29 below gas-liquid contact section 30. Section 30 consists of a conventional means for gas-liquid contact, such as a bed of spherical packing or Raschig rings, bubble cap trays or sieve trays. The rising gas phase in section 30 is contacted with scrubbing liquid stream 31, which usually consists of concentrated aqueous sulfuric acid solution and is admitted into unit 29 above section 30. The downflowing liquid phase in section 30 absorbs substantially all of the sulfur trioxide from the rising gas phase, with the concomitant formation of further concentrated sulfuric acid or oleum. Due to the provision of an elevated pressure within unit 29, typically in the range of 3 kg./sq. cm. to 50 kg./sq. cm., the absorption of sulfur trioxide is rapidly and substantially completely attained. The resultant liquid phase containing dissolved sulfur trioxide is withdrawn from the bottom of unit 20 as stream 32, which is divided into product sulfuric acid or oleum stream 33 and recycle stream 34. The recycle acid stream 34 is cooled in heat exchanger 35, usually by heat exchange with cooling water, and is recycled as stream 31. Makeup dilute sulfuric acid or water is added to stream 31 as required.

The residual scrubbed gas stream 36 discharged from unit 29 above section 30 is now substantially free of sulfur trioxide, however stream 36 is at an elevated pressure and is utilized for the generation of useful power by expansion through mechanical power recovery means. Stream 36 is first passed through unit 19, and is heated by heat exchange with the hot process gas stream 18, in order to recover additional power. The resultant heated residual gas stream 37, now at elevated pressure and an elevated temperature typically in the range of 350° C. to 550° C., is expanded through mechanical power recovery means 38, which will usually consist of a gas turbine or other suitable device for the recovery of power from gas expansion. The resulting expanded and cooled gas stream 39, now usually at substantially atmospheric pressure, is discharged through a disposal stack, not shown. The shaft of turbine 38 is connected by coupling 40 to the shaft of compressor 2, and thus unit 38 provides at least a portion of the power requirement for operation of unit 2.

In instances when the power generated by unit 38 is not sufficient to operate unit 2, additional power may be furnished by an electric motor or other suitable means to drive unit 2. The additional power is preferably furnished by the provision of steam turbine 41, the shaft of which is connected in tandem with unit 38 by coupling 42. Motive steam is provided to unit 41 via stream 43, with low pressure exhaust steam of condensate being discharged from unit 41 via stream 44. In some instances, a portion or all of stream 9 may be passed to unit 41 as stream 43. In other cases, an alternative fluid available at elevated pressure may be employed as stream 43.

Numerous alternatives within the scope of the present invention besides those mentioned supra, will occur to those skilled in the art. The ranges of process variables such as pressure and temperature mentioned supra are preferable ranges for optimum utilization of the process concepts of the present invention, and in suitable instances the process may be effectively carried out under operating conditions outside these ranges of process variables.

Stream 5 may be omitted in some instances, with the entire stream 3 passing into furnace 7. The provision of stream 5 is desirable in most facilities, in order to reduce the size and volume of furnace 7 and also to provide moderation of the temperature of stream 10. In instances where the sulfur dioxide-containing process gas stream is produced at relatively lower temperatures and suitable for direct passage to catalytic conversion, coil 18 and its function may be omitted. In some cases, as when the sulfur-containing feed stream consists of pyrites, the initial sulfur dioxide-containing process gas stream is laden with entrained solids. In these instances, the process gas stream is treated for solids removal, either by dry filtration or by scrubbing with a liquid such as water. The liquid scrub will usually provide a concomitant cooling of the gas stream, and in such instances coil 8 may be omitted and the process gas stream may even require reheating to optimum catalytic conversion temperature after the liquid scrub.

As mentioned supra, the converter unit 12 will usually be provided with a plurality of catalyst beds and interbed gas cooling means. In the usual commercial facilities, three or more beds may be provided in order to achieve controlled conversion of a portion of the sulfur dioxide in each bed and thus closely regulate the conversion temperature in each bed and prevent overheating of the beds with concomitant catalyst deterioration.

In some instances, sulfuric acid or oleum may be the only desired product, in which case the processing leading to the production of liquid sulfur trioxide stream 27 may be omitted. In this event, stream 20 would be passed directly into unit 29 below section 30, and units 21 and 26 and their functions would be omitted.

Stream 37 may be further heated by heat exchange with stream 10, prior to expansion in unit 38, in order to provide greater power generation by unit 38. Product acid stream 33 may be withdrawn from the cooled stream 31 rather than from stream 32, in suitable instances.

An example of an industrial application of the process of the present invention will now be described.

Example

The process of the present invention was applied in a facility producing both liquid sulfur trioxide and concentrated sulfuric acid. Stream 1, consisting of pre-dried atmospheric air, was passed into unit 2 at a rate of 565 standard cubic meters per minute, was measured at 1.03 kg./sq. cm. and 0° C. Actual compressor inlet conditions for stream 1 were 1.02 kg./sq. cm. and 30° C. Unit 2 was a standard centrifugal compressor operating at 13,130 revolutions per minute, and required a power input of 4650 horsepower. The resulting stream 3 discharged from unit 2 was at a pressure of 8.1 kg./sq. cm. Conventional operating temperatures were maintained in units 7 and 12, and stream 20 was thus produced contaiang 12% sulfur trioxide by volume. This process stream was cooled in unit 21 to form stream 25 at 23° C., with concomitant condensation of 63.5% of the original sulfur trioxide content, which was removed as product liquid sulfur trioxide stream 27. The remaining sulfur trioxide was removed from stream 28 in unit 29 to form product 98% liquid sulfuric acid stream 33. After reheating in unit 19, stream 37 was produced at 7.03 kg./sq. cm. pressure and 400° C. The mass flow of stream 37 consisted of about 85% of the original weight of stream 3, and stream 37 was expanded in unit 38 to form stream 39 at a discharge pressure of 1.05 kg./sq. cm., with the concomitant generation of 3250 horsepower by unit 38, which was transmitted to unit via coupling 40. The necessary additional power for operation of unit 2, consisting of 1400 horsepower, was furnished by an electric motor connected to coupling 42. The electric motor was also employed for plant startup purposes.

I claim:

1. A process for the production of sulfur trioxide and sulfuric acid which comprises compressing air in mechanical compression means to a pressure in the range of 3 kg./sq. cm. to 50 kg./sq. cm., burning a sulfur-containing feed stream at elevated pressure with the compressed air, whereby a process gas stream containing in the range of 6% to 14% by volume of sulfur dioxide content and excess free oxygen is produced at elevated pressure and a temperature in the range of 600° C. to 1200° C., cooling said process gas stream to a temperature in the range of 350° C. to 550° C., passing said cooled process gas stream through catalytic conversion means for the oxidation of sulfur dioxide to sulfur trioxide, whereby substantially all of the sulfur dioxide content of said process gas stream is converted to sulfur trixode at elevated pressure, cooling the resulting sulfur trioxide-containing process gas stream in heat exchange means to a temperature in the range of 50° C. to 200° C., further cooling said process gas stream to a temperature in the range of 5° C. to 40° C., whereby a portion of said sulfur trioxide is condensed to substantially pure liquid sulfur trioxide, separating said condensed liquid sulfur trioxide from the remaining process gas stream as product liquid sulfur trioxide, scrubbing said remaining process gas stream at elevated pressure with concentrated liquid sulfuric acid, whereby the remaining gaseous sulfur trioxide is absorbed into the liquid phase to form further sulfuric acid and a residual high pressure gas stream is produced substantially free of sulfur oxides, heating said residual high pressure gas stream in said heat exchange means to a temperature in the range of 350° C. to 550° C. by heat exchange with said sulfur trioxide-containing process gas stream, and expanding the resulting heated residual high pressure gas stream to substantially atmoshperic pressure in mechanical power recovery means, said mechanical power recovery means being connected with said mechanical compression means, whereby said mechanical power recovery means provides at least a portion of the power requirement for operation of said mechanical compression means.

References Cited
UNITED STATES PATENTS

| | | | |
|---|---|---|---|
| 2,075,075 | 3/1937 | Zeisberg | 23—167 |
| 2,510,684 | 6/1950 | Cathala | 23—174 |

FOREIGN PATENTS

| | | |
|---|---|---|
| 467,298 | 6/1937 | Great Britain. |

OSCAR R. VERTIZ, Primary Examiner

A. GREIF, Assistant Examiner

U.S. Cl. X.R.

23—174, 175